US010111153B2

(12) United States Patent
Takeda et al.

(10) Patent No.: US 10,111,153 B2
(45) Date of Patent: Oct. 23, 2018

(54) WIRELESS RELAY DEVICE, WIRELESS COMMUNICATION SYSTEM, AND WIRELESS COMMUNICATION METHOD

(71) Applicant: YOKOGAWA ELECTRIC CORPORATION, Tokyo (JP)

(72) Inventors: Kenichi Takeda, Tokyo (JP); Naoyuki Fujimoto, Tokyo (JP); Masato Yamaji, Tokyo (JP); Haruka Yamada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 142 days.

(21) Appl. No.: 15/245,252

(22) Filed: Aug. 24, 2016

(65) Prior Publication Data

US 2017/0064607 A1 Mar. 2, 2017

(30) Foreign Application Priority Data

Aug. 27, 2015 (JP) .................................. 2015-168224

(51) Int. Cl.
  *H04B 7/14* (2006.01)
  *H04J 1/10* (2006.01)
  (Continued)

(52) U.S. Cl.
  CPC ........ *H04W 40/22* (2013.01); *G05B 19/4063* (2013.01); *G05B 19/4185* (2013.01);
  (Continued)

(58) Field of Classification Search
  CPC ..... H04W 40/22; H04W 12/02; H04W 12/04; H04W 12/12; H04W 4/005; H04W 88/12; G05B 19/4063; G05B 19/4185
  See application file for complete search history.

(56) References Cited

U.S. PATENT DOCUMENTS

2004/0162996 A1* 8/2004 Wallace ................ H04L 63/104
  726/1
2008/0079597 A1* 4/2008 Tambascio .......... H04L 63/0428
  340/679
(Continued)

FOREIGN PATENT DOCUMENTS

EP 1873604 A1 1/2008
EP 1906622 A2 4/2008
(Continued)

OTHER PUBLICATIONS

Shuji Yamamoto et al., "World's First Wireless Field Instrument Based on ISA100.11a", Yokogawa Technical Report English Edition, 2010, pp. 75-78, vol. 53, No. 2.
(Continued)

*Primary Examiner* — Stephen M D Agosta
(74) *Attorney, Agent, or Firm* — Sughrue Mion, PLLC (57) ABSTRACT

A wireless relay device that performs relay of encrypted data over a wireless network, the wireless relay device, includes: a determiner that determines whether or not there is an abnormality using first data which is transmitted to its own device from wireless devices belonging to a preset section among wireless devices joining the wireless network; a transmission controller that transmits second data indicating a result of the determination of the determiner to a preset transmission destination; and an encryption processor that decrypts the first data and encrypts the second data transmitted by the transmission controller.

9 Claims, 4 Drawing Sheets

(51) Int. Cl.

| | | |
|---|---|---|
| *H04J 3/08* | (2006.01) | |
| *H04W 40/22* | (2009.01) | |
| *G05B 19/4063* | (2006.01) | |
| *G05B 19/418* | (2006.01) | |
| *H04L 29/06* | (2006.01) | |
| *H04W 12/02* | (2009.01) | |
| *H04W 12/12* | (2009.01) | |
| *H04L 29/08* | (2006.01) | |
| *H04L 1/00* | (2006.01) | |
| *H04L 1/24* | (2006.01) | |
| *H04W 12/04* | (2009.01) | |
| *H04W 4/70* | (2018.01) | |
| *H04W 4/00* | (2018.01) | |
| *H04L 12/801* | (2013.01) | |
| *H04W 88/12* | (2009.01) | |
| *H04W 88/16* | (2009.01) | |

(52) U.S. Cl.
CPC ............ *H04L 1/0016* (2013.01); *H04L 1/245* (2013.01); *H04L 63/0464* (2013.01); *H04L 67/12* (2013.01); *H04W 12/02* (2013.01); *H04W 12/04* (2013.01); *H04W 12/12* (2013.01); *G05B 2219/31093* (2013.01); *H04L 47/29* (2013.01); *H04L 63/14* (2013.01); *H04L 63/1408* (2013.01); *H04W 4/005* (2013.01); *H04W 4/70* (2018.02); *H04W 88/12* (2013.01); *H04W 88/16* (2013.01)

(56) References Cited

U.S. PATENT DOCUMENTS

| | | | |
|---|---|---|---|
| 2009/0204368 A1* | 8/2009 | Bickel | ............... G01D 3/10 |
| | | | 702/179 |
| 2013/0094500 A1 | 4/2013 | Rotvold et al. | |
| 2014/0047107 A1 | 2/2014 | Maturana et al. | |
| 2014/0177518 A1 | 6/2014 | Akisada et al. | |

FOREIGN PATENT DOCUMENTS

| | | |
|---|---|---|
| EP | 3 076 564 A1 | 10/2016 |
| JP | 2001-007935 A | 1/2001 |
| JP | 2001-312784 A | 11/2001 |
| JP | 2002-73438 A | 3/2002 |
| JP | 2002-298252 A | 10/2002 |
| JP | 2003-195934 A | 7/2003 |
| JP | 2004-129232 A | 4/2004 |
| JP | 2010-61530 A | 3/2010 |
| JP | 2011-155409 A | 8/2011 |
| JP | 2014-533460 A | 12/2014 |
| WO | 2013/055408 A1 | 4/2013 |

OTHER PUBLICATIONS

Communication dated Mar. 23, 2018 issued by the European Patent Office in counterpart European Patent Application No. 16185446.8.

* cited by examiner

WIRELESS RELAY DEVICE, WIRELESS COMMUNICATION SYSTEM, AND WIRELESS COMMUNICATION METHOD

BACKGROUND OF THE INVENTION

Field of the Invention

The present invention relates to a wireless relay device, a wireless communication system, and a wireless communication method.

Priority is claimed on Japanese Patent Application No. 2015-168224, filed on Aug. 27, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, a distributed control system (DCS) has been constructed in plants or factories, and a highly automated operation has been realized. This distributed control system is a system in which a field device (measurement device or an operating device) and a control device that performs control of the field device are connected via communication means. Some communication systems that are a basis of such a distributed control system perform wired communication. In recent years, a wireless communication system that performs wireless communication conforming to Industrial wireless communication standard such as ISA100.11a or WirelessHART (registered trademark) has been realized.

In such a wireless communication system, it is necessary to ensure security. Accordingly, various items of data communicated over a wireless network are often encrypted using an encryption technology. For example, in a wireless communication system conforming to ISA100.11a described above, encryption is performed using an encryption key distributed from a management device that performs management of the wireless network to each field device. Since the encryption keys that are distributed to the respective field devices differ from each other, high security is ensured.

Shuji Yamamoto et al., "World's First Wireless Field Instruments Based on ISA100.11a", Yokogawa Technical Report, Vol. 53, No. 2, 2010 (hereinafter referred to as Non-Patent Document 1) discloses an overview of a wireless communication system conforming to ISA100.11a described above. Further, Non-Patent Document 1 discloses a gateway in which a gateway function, a system management function (system manager), a security management function (security manager), and the like are integrated. In this gateway, distribution and updating of a security key (encryption key) are performed by the security management function.

Incidentally, in the above-described wireless communication system disclosed in Non-Patent Document 1, encryption keys for encrypting and decrypting data communicated over a wireless network are provided in a field device and a gateway. Therefore, various types of data transmitted from the field device are encrypted, transmitted to the gateway, decrypted, and centrally managed for each field device at a high-level device located at a high level of the gateway. However, such a management causes the following problems during an actual operation of the plant.

(1) Degradation of Efficiency of Plant Operation

If information obtained from a field device is managed for each field device, a high-level device generates alarm even when an abnormal field device does not directly influence on an operation of the plant. If the alarm is generated, for example, the plant stops until safety is confirmed by an operator. Accordingly, there is a problem in which efficiency of the operation of the plant is degraded. In an extreme example, in a large-scale wireless network (for example, a wireless network to which more than million wireless fields or the like are connected), a situation occurs in which the plant stops until the operator confirms content of the alarm and takes appropriate measures if the number of field devices in an abnormal state is 1.

(2) Increase in Burden of Operator

In a case in which alarms are generated from the high-level device, it is necessary for the operator of the plant to appropriately decide a degree of influence of the alarms on the operation of the plant and cope with the alarms, for each of the generated alarms. Therefore, it may be considered that the number of types of alarms and a frequency of generation of alarms also increase as a scale of the wireless network built in the plant increases. Accordingly, there is a problem in that a burden of the operator increases.

(3) Degradation of Efficiency of Device Maintenance Work

Since information transmitted from a field device to a high-level device includes information indicating a status of the field device, efficiency of work in the field is considered to be able to be improved if a worker performing conservation and maintenance work in the field can obtain information transmitted from the field device to the high-level device in the field. However, since various pieces of information transmitted from the field devices are encrypted, transmitted to the wireless network, and centrally managed in the high-level device, the worker in the field cannot utilize the information. Accordingly, there is a problem in that efficiency of device maintenance work is greatly degraded.

SUMMARY OF THE INVENTION

The present invention provides a wireless relay device, a wireless communication system, and a wireless communication method capable of achieving improved efficiency of an operation of a plant and a reduced burden of an operator and preventing degradation in efficiency of device maintenance work.

A wireless relay device of the present invention is a wireless relay device (12) that performs relay of encrypted data over a wireless network (N1), the wireless relay device including: a determiner (25) that determines whether or not there is an abnormality using first data which is transmitted to its own device from wireless devices (11a to 11c) belonging to a preset section among wireless devices (11a to 11e) joining the wireless network; a transmission controller (24) that transmits second data indicating a result of the determination of the determiner to a preset transmission destination; and an encryption processor (23) that decrypts the first data and encrypts the second data transmitted by the transmission controller.

Further, in the wireless relay device of the present invention, the determiner individually determines whether or not there is an abnormality in each of the wireless devices belonging to the section using the first data.

Further, in the wireless relay device of the present invention, the determiner determines whether or not there is an abnormality in the section on the basis of a combination of results of the determination as to whether or not there is an abnormality in each of the wireless devices belonging to the section.

Further, the wireless relay device of the present invention further includes a storage (27) that stores a first determination table (TB1) in which a first determination criterion for determining whether or not there is an abnormality in each of the wireless devices belonging to the section is set, and a second determination table (TB2) in which a combination of results of the determination as to whether or not there is an abnormality in each of the wireless devices belonging to the section and a second determination criterion for determining whether or not there is an abnormality in the section are associated with each other for each diagnosis target in the section, and the determiner determines whether or not there is an abnormality in the section using the first determination table and the second determination table.

Further, the wireless relay device of the present invention further includes a storage (27) that stores at least one of the first data and the second data decrypted by the encryption processor.

Further, the wireless relay device of the present invention further includes: an interface (28) to which an external device (TM) is able to be connected; and a controller (26) that reads at least one of the first data and the second data stored in the storage and outputs the data to the interface on the basis of a request from the external device connected to the interface.

A wireless communication system of the present invention is wireless communication system (1) capable of wireless communication over a wireless network (N1), the wireless communication system including: the wireless relay device (12) described above; and a high-level device (16) that collects the second data transmitted from the wireless relay device.

Further, the wireless communication system of the present invention further includes a gateway (15) that is set as a transmission destination of the second data, decrypts the second data transmitted from the wireless relay device, and outputs the decrypted data to the high-level device.

Further, the wireless communication system of the present invention further includes a management device (14) that that performs a setting of the section and performs a setting of a transmission destination of the second data for the wireless relay device.

Further, in the wireless communication system of the present invention, the management device sets a first encryption key (K1 to K3) for use in a process of encrypting the first data for the wireless device and the wireless relay device belonging to the section, and sets a second encryption key (K10) for use in a process of encrypting the second data for the wireless relay device and the gateway.

Further, in the wireless communication system of the present invention, the high-level device sets, for the wireless relay device, a determination table (TB1and TB2) for use in a determination as to whether or not there is an abnormality in the determiner.

A wireless communication method of the present invention is a wireless communication method of performing wireless communication over a wireless network (N1), and includes: a first step (S11) of receiving first data which is transmitted to its own device from wireless devices (11a to 11c) belonging to a preset section among wireless devices (11a to 11e) joining the wireless network; a second step (S12) of decrypting the first data received in the first step; a third step (S14 and S15) of determining whether or not there is an abnormality using the first data decrypted in the second step; a fourth step (S16) of encrypting a result of the determination of the third step, as second data; and a fifth step (S17) of transmitting the second data to the wireless network.

Further, in the wireless communication method of the present invention, the third step includes: a first determination step (S14) of individually determining whether or not there is an abnormality in each of the wireless devices belonging to the section using the first data; and a second determination step (S15) of determining whether or not there is an abnormality in the section on the basis of a combination of results of the determination in the first determination step.

According to the present invention, the wireless relay device that decrypts the first data transmitted to its own device from the wireless device belonging to the preset section, determines whether or not there is an abnormality using the first decrypted data, encrypts the second data indicating the result of determination, and transmits the second encrypted data to a preset transmission destination is provided in the wireless network. Therefore, there is an effect that it is possible to achieve improved efficiency of an operation of a plant and a reduced burden of an operator.

Further, according to the present invention, the interface to which an external device is able to be connected, and the controller that reads the first data stored therein and outputs the data to the interface on the basis of a request from the external device connected to the interface are provided in the wireless relay device. Therefore, there is an effect that it is possible to prevent degradation in efficiency of device maintenance work.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Hereinafter, a wireless relay device, a wireless communication system, and a wireless communication method will be described in detail according to an embodiment of the present invention with reference to the drawings.

(The Wireless Communication System)

Figure 1:
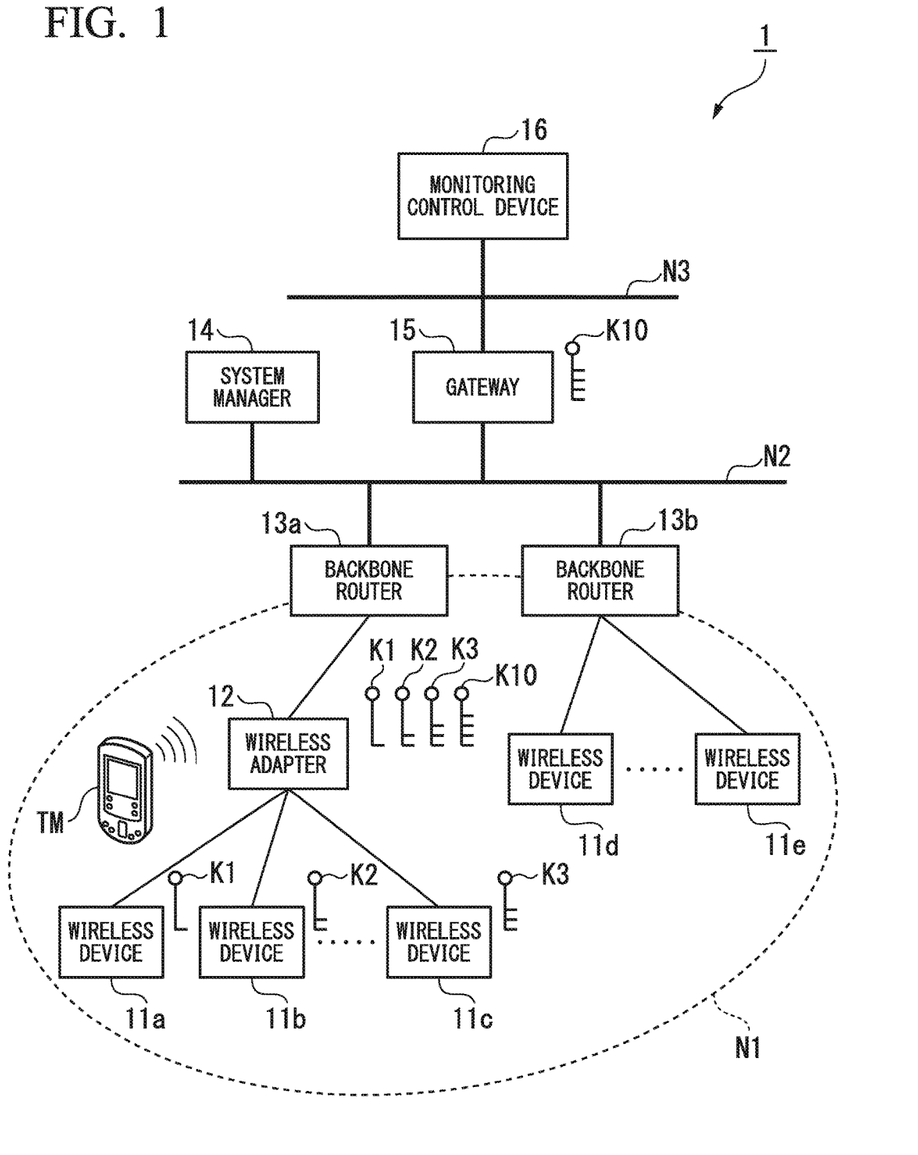
FIG. 1 is a block diagram illustrating an entire configuration of a wireless communication system according to an embodiment of the present invention.

FIG. 1 is a block diagram illustrating an entire configuration of a wireless communication system according to an embodiment of the present invention. As illustrated in FIG. 1, the wireless communication system 1 of this embodiment includes wireless devices 11a to 11e, a wireless adapter 12 (wireless relay devices), backbone routers 13a and 13b, a system manager 14 (management device), a gateway 15, and a monitoring control device 16 (high-level device). The wireless communication system 1 having such a configuration is capable of wireless communication using a time division multiple access (TDMA) scheme over a wireless network N1.

This wireless communication system 1 is constructed in, for example, a plant or a factory (hereinafter collectively referred to simply as a "plant"). Here, the above-described plant includes a plant that manages and controls a wellhead such as a gas field or an oil field or its surroundings, a plant that manages and controls power generation such as hydroelectric power generation, thermal power generation, and nuclear power generation, a plant that manages and controls environmental power generation such as solar power generation or wind power generation, or a plant that manages and controls water and sewage, a dam, and the like, in addition to an industrial plant such a chemical plant.

The wireless network N1 is a wireless network that is formed by devices (the wireless devices 11a to 11e, the wireless adapter 12, and the wireless routers 13a and 13b) and managed by the system manager 14. Although simplified and illustrated in FIG. 1, the number of the wireless devices 11a to 11e forming the wireless network N1, the wireless adapter 12, and the wireless routers 13a and 13b is arbitrary.

Further, in the plant in which the wireless communication system 1 is constructed, a backbone network N2 and a control network N3 are provided, in addition to the wireless network N1. The backbone network N2 is a wired network serving as a backbone of the wireless communication system 1, and the backbone routers 13a and 13b, the system manager 14, and the gateway 15 are connected to the backbone network N2. The control network N3 is a wired network located at an upper level of the backbone network N2, and the gateway 15 and the monitoring control device 16 are connected to the control network N3. The backbone network N2 and the control network N3 may be realized as wireless communication networks.

The wireless devices 11a to 11e are field devices (wireless field devices) that are installed in the field of the plant and perform measurement, an operation, or the like necessary for process control under the control of the monitoring control device 16. Specifically, the wireless devices 11a to 11e are, for example, sensor devices such as a flow meter or a temperature sensor, valve devices such as a flow control valve or an opening and closing valve, actuator devices such as a fan or a motor, imaging devices such as a camera or a video recorder that images a situation or an object in a plant, audio devices such as a microphone or a speaker that collects different sound or the like in the plant or generates alarm sound, position detection devices that outputs position information of each device, or other devices. This wireless devices 11a to 11e perform a power-saving operation (for example, an intermittent operation) using a battery as a power source, and are capable of wireless communication using a TDMA scheme conforming to wireless communication standard ISA100.11a.

Here, different encryption keys are distributed to the wireless devices 11a to 11e in order to ensure security. For example, the encryption key K1 is distributed to the wireless device 11a, the encryption key K2 is distributed to the wireless device 11b, and the encryption key K3 is distributed to the wireless device 11c. In FIG. 1, the encryption keys distributed to the wireless devices 11d and 11e are not illustrated.

The encryption key K1 is an encryption key for use in encryption communication between the wireless device 11a and the wireless adapter 12. The encryption key K2 is an encryption key for use in encryption communication between the wireless device 11b and the wireless adapter 12. The encryption key K3 is an encryption key for use in encryption communication between the wireless device 11c and the wireless adapter 12. The encryption keys K1 to K3 and the encryption keys (not illustrated) of the wireless devices 11d and 11e are distributed by the system manager 14 when the wireless devices 11a to 11e join the wireless network N1.

Further, the wireless devices 11a to 11e are divided into a plurality of sections by the monitoring control device 16 in advance. In the example illustrated in FIG. 1, the wireless devices 11a to 11c are divided to belong to one section, and the wireless devices 11d and 11e are divided to belong to another section. The wireless devices 11a to 11c belonging to the former section are managed in the wireless adapter 12, and the wireless devices 11d and 11e belonging to the latter section are managed by the backbone routers 13b. This sectioning is performed so as to distribute and manage the wireless devices 11a to 11e, prevent degradation in efficiency of an operation of the plant, and achieve a reduced a burden of an operator.

In addition, in the wireless devices 11a to 11e, a setting of transmission of data according to the section is performed. Specifically, in the wireless devices 11a to 11c, the wireless adapter 12 is set as a transmission destination of data, and a transmission timing (transmission interval) of data to the wireless adapter 12 is set. Further, in the wireless devices 11d and 11e, the backbone router 13b is set as a transmission destination of data, and a timing of transmission (transmission interval) of data to the backbone router 13b is set. The setting is performed by the system manager 14 after the wireless devices 11a to 11e join the wireless network N1.

The wireless adapter 12 is capable of wireless communication conforming to the wireless communication standard ISA100.11a. The wireless adapter 12 is connected to the wireless network N1 so that the wireless adapter 12 is capable of communication, and performs relay of data (encrypted data) over the wireless network N1. Further, the wireless adapter 12 determines whether or not there is an abnormality using data (first data) transmitted to its own device from the wireless devices (the wireless devices 11a to 11c), which belongs to the section managed by its own device, among the wireless devices 11a to 11e joining the wireless network N1, and transmits data (second data) indicating a result of the determination to a preset transmission destination. In this embodiment, the transmission destination of the data indicating the determination result of the wireless adapter 12 is assumed to be set to the gateway 15.

When the wireless adapter 12 performs the above process, the wireless adapter 12 decrypts the data transmitted to its own device, encrypts the data indicating the determination result, and then transfers the encrypted data to a preset transfer destination (the gateway 15). The data transmitted from the wireless devices 11a to 11c to its own device is decrypted since the decrypted data is necessary for a determination as to whether or not there is an abnormality and is allowed to be referred to in the field of the plant, the data indicating a result of the determination as to whether or not there is an abnormality is encrypted to ensure the security. The data decrypted by the wireless adapter 12 is stored in the wireless adapter 12.

As illustrated in FIG. 1, different encryption keys are distributed to the wireless adapter 12 in order to ensure security. Specifically, an encryption key K10 is distributed in addition to the above-described encryption keys K1 to K3. The encryption key K10 is an encryption key for use in encryption communication between the wireless adapter 12 and the gateway 15. The encryption keys K1 to K3 and K10 are distributed by the system manager 14 when the wireless adapter 12 joins the wireless network N1.

Further, the wireless adapter 12 is configured to be capable of communicating with an information terminal device TM (external device) such as a smartphone, a tablet computer, or a laptop computer. For example, the wireless adapter 12 is configured to be capable of wireless communication such as infrared communication or near field communication (NFC) with the information terminal device TM. The wireless adapter 12 may be configured to be capable of wire communication such as Universal Serial Bus (USB). The wireless adapter 12 outputs data stored therein to the information terminal device TM on the basis of a request from the information terminal device TM. An internal configuration of the wireless adapter 12 will be described below.

The backbone routers 13a and 13b connect the wireless network N1 and the backbone network N2 with each other, and perform relay of data that is transmitted and received between the wireless network N1 and the backbone network N2. The backbone routers 13a and 13b also perform wireless communication conforming to the wireless communication standard ISA100.11a described above. Here, the same function as that of the wireless adapter 12 described above is provided in the backbone routers 13b, which determines whether or not there is an abnormality using data (first data) transmitted to its own device from the wireless devices (the wireless devices 11d and 11e) belonging to the section managed by its own device, and transmits data (second data) indicating a result of determination to a preset transmission destination (gateway 15).

The system manager 14 performs control of the wireless communication that is performed over the wireless network N1. Specifically, the system manager 14 performs control of allocation of communication resources (time slots and communication channels) to the wireless devices 11a to 11e, the wireless adapter 12, the backbone routers 13a and 13b, and the gateway 15, to realize wireless communication using TDMA over the wireless network N1. Further, the system manager 14 performs a process (a joining process) of causing the wireless devices 11a to 11e, the wireless adapter 12, and the backbone routers 13a and 13b to join or not to join the wireless network N1.

Further, the system manager 14 performs distribution of the encryption keys (for example, the above-described encryption keys K1 to K3 and K10) when causing the wireless devices 11a to 11e, the wireless adapter 12, and the backbone routers 13a and 13b to join the wireless network N1. Further, the system manager 14 performs setting of the section to which the wireless devices 11a to 11e belong and setting of a transmission destination of the determination result of the wireless adapter 12 with respect to the wireless adapter 12.

The gateway 15 connects the backbone network N2 and the control network N3, and performs relay of various types of data that are transmitted and received between the wireless devices 11a to 11e, the system manager 14, or the like and the monitoring control device 16. By providing this gateway 15, it is possible to connect the backbone network N2 and the control network N3 to each other while maintaining security. The above-described encryption key K10 is distributed to the gateway 15. The gateway 15 performs decryption of data received from the wireless adapter 12 using the encryption key K10 and outputs the decrypted data to the monitoring control device 16.

The monitoring control device 16 performs monitoring and management of the wireless devices 11a to 11e, and the like. Specifically, the monitoring control device 16 performs monitoring of the wireless devices 11a to 11e, and the like by collecting data (including data indicating a result of a determination as to whether or not there is an abnormality) received from the wireless adapter 12 and the backbone router 13b. Further, the monitoring control device 16 obtains the amount of control of the wireless device on the basis of the various types of collected data, and transmits control data indicating the control amount at predetermined time intervals via the gateway 15 to control the wireless device (for example, the wireless device 11c).

(Wireless Relay Device)

Figure 2:
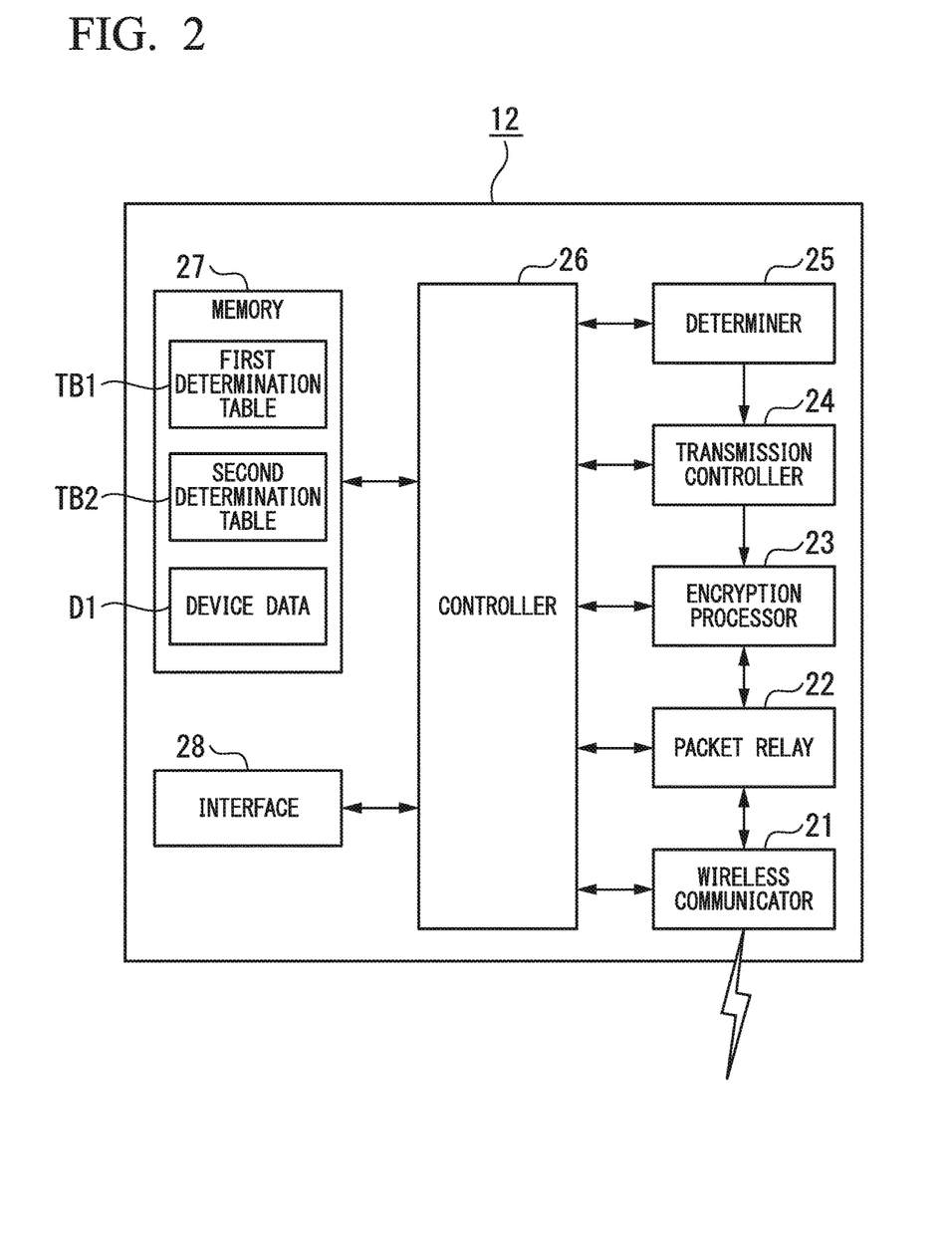
FIG. 2 is a block diagram illustrating a main configuration of a wireless adapter as a wireless relay device according to an embodiment of the present invention.

FIG. 2 is a block diagram illustrating a main configuration of a wireless adapter as a wireless relay device according to an embodiment of the present invention. As illustrated in FIG. 2, the wireless adapter 12 includes a wireless communicator 21, a packet relay 22, an encryption processor 23, a transmission controller 24, a determiner 25, a controller 26, a memory 27 (a storage or a storage unit), and an interface 28, and performs relay of encrypted data over the wireless network N1.

The wireless communicator 21 performs transmission and reception of a radio signal under the control of the controller 26. Specifically, the wireless communicator 21 receives data (packet) transmitted as a radio signal over the wireless network N1, and transmits data (packet) to be transmitted as a radio signal over the wireless network N1. The packet relay 22 performs a process of relaying a packet that is transmitted and received by the wireless communicator 21 under the control of the controller 26. Specifically, the packet relay 22 outputs the packet received by the wireless communicator 21 to the encryption processor 23 in a case in which the packet received by the wireless communicator 21 is directed to its own device, and to the wireless communicator 21 in a case in which the packet received by the wireless communicator 21 is not directed to its own device. Further, the packet relay 22 outputs the data output from the encryption processor 23 (a packet to be transmitted to the gateway 15) to the wireless communicator 21.

The encryption processor 23 performs an encryption process using the encryption keys K1 to K3, and K10 illustrated in FIG. 1 under the control of the controller 26. Specifically, the encryption processor 23 performs decryption of the packet output from the packet relay 22 and outputs the decrypted packet to the controller 26, and performs encryption of the data output from the transmission controller 24 and outputs the encrypted data to the packet relay 22. For example, the encryption processor 23 decrypts the packet of its own device received from the wireless devices 11a to 11c over the wireless network N1 using the encryption keys K1 to K3 and outputs the decrypted packet to the controller 26. Further, the encryption processor 23 encrypts the data output from the transmission controller 24 using the encryption key K10 and outputs the encrypted data to the packet relay 22.

The transmission controller 24 performs a transmission process of transmitting the data indicating the determination result of the determiner 25 to a preset transmission destination (the gateway 15) under the control of the controller 26. The determiner 25 determines whether or not there is an abnormality using the data received from the wireless devices 11*a* to 11*c*. Specifically, the determiner 25 individually determines whether or not there is an abnormality in each of the wireless devices 11*a* to 11*c* using the data received from the wireless devices 11*a* to 11*c* belonging to the section managed by its own device by referring to the first determination table TB1 stored in the memory 27.

Further, the determiner 25 collectively determines whether or not there is an abnormality in the diagnosis target in the section on the basis of the combination of the results of the determination as to whether or not there is an abnormality in each of the wireless devices 11*a* to 11*c* belonging to the section managed by its own device by referring to the second determination table TB2 stored in the memory 27. For example, the determiner 25 collectively determines whether or not there is an abnormality in a compressor (diagnosis target) on the basis of the combination of the results of the determination as to whether or not there is an abnormality in a plurality of vibration sensors. The determination as to whether or not there is an abnormality in the compressor on the basis of only the result of the determination as to whether or not there is an abnormality in one vibration sensor is difficult, but the determination as to whether or not there is an abnormality in the compressor can be performed by considering the results of the determination as to whether or not there is an abnormality in a plurality of vibration sensors.

The controller 26 collectively controls an operation of the wireless adapter 12. For example, the controller 26 controls the wireless communicator 21, the packet relay 22, the encryption processor 23, the transmission controller 24, and the determiner 25 so that data transmitted from the wireless devices 11*a* to 11*c* belonging to the section managed by its own device is stored as device data D1 in the memory 27, it is determined whether or not there is an abnormality in the section managed by its own device, and data indicating a result of the determination is transmitted to the gateway 15. Further, the controller 26 performs control to read the device data D1 stored in the memory 27 and outputs the device data D1 to the information terminal device TM on the basis of a request from the information terminal device TM illustrated in FIG. 1.

The memory 27 is, for example, a nonvolatile semiconductor memory, and stores the first determination table TB1 (determination table), the second determination table TB2 (determination table), and the device data D1. Writing of the data to the memory 27 and reading of the data from the memory 27 are controlled by the controller 26. The device data D1 is data transmitted from the wireless devices 11*a* to 11*c*, and includes, for example, data (sensor data) such as a flow rate measured by the wireless devices 11*a* to 11*c*, and data (status data) indicating a status of the wireless devices 11*a* to 11*c*.

Figure 3:
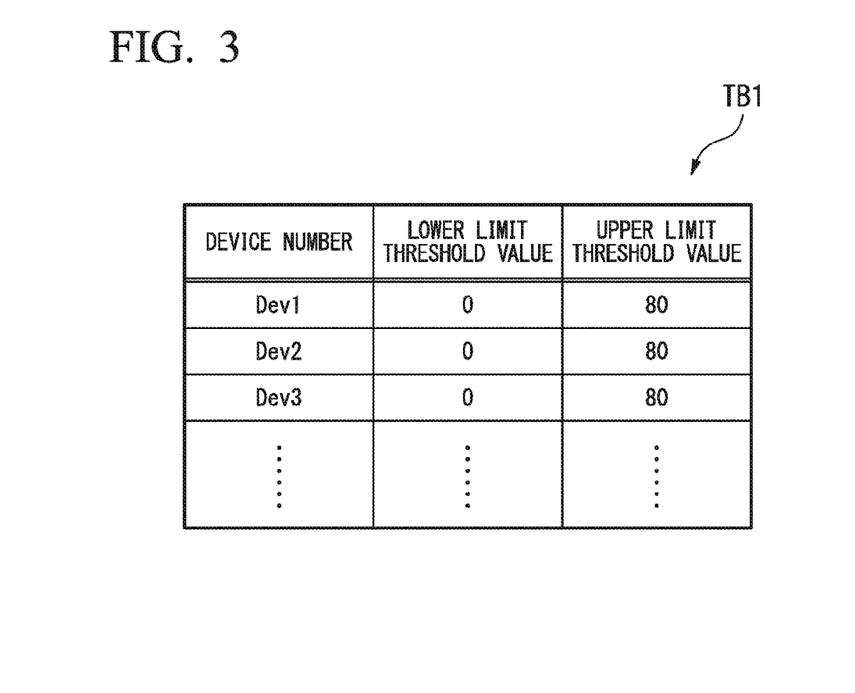
FIG. 3 is a diagram illustrating an example of a first determination table for use in a wireless adapter as the wireless relay device according to an embodiment of the present invention.

FIG. 3 is a diagram illustrating an example of the first determination table for use in the wireless adapter as the wireless relay device according to an embodiment of the present invention. As illustrated in FIG. 3, the first determination table TB1 is a table in which a lower threshold value and an upper threshold value (first criterion) for determining whether or not there is an abnormality in each of the wireless devices 11*a* to 11*c* are set for each of the device numbers assigned to the respective wireless devices 11*a* to 11*c* belonging to the section managed by the wireless adapter 12.

For example, "Dev1" illustrated in FIG. 3 is a device number assigned to the wireless device 11*a*, "Dev2" illustrated in FIG. 3 is a device number assigned to the wireless device 11*b*, and "Dev3" illustrated in FIG. 3 is a device number assigned to the wireless device 11*c*. Further, in the example illustrated in FIG. 3, a lower limit threshold value "0" is set and an upper limit threshold value "80" is set in each of the device number "Dev1", "Dev2", and "Dev3".

Figure 4:
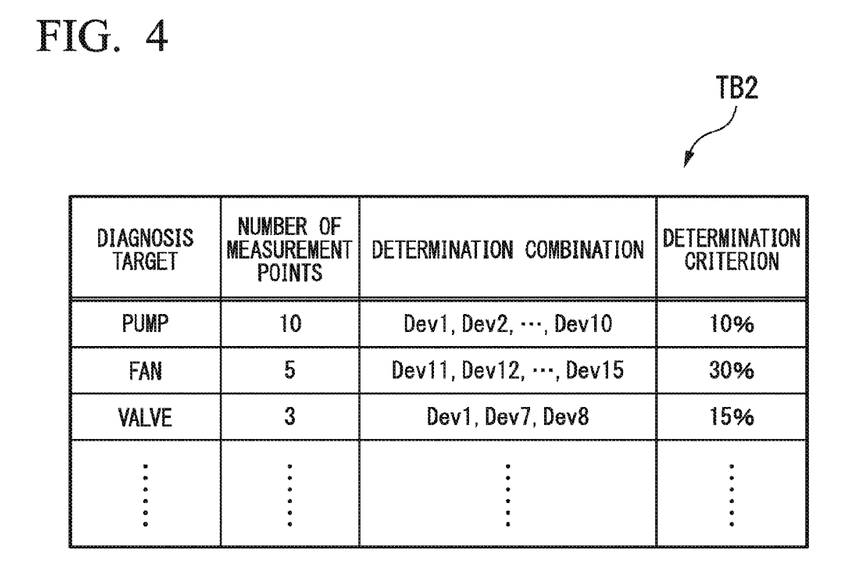
FIG. 4 is a diagram illustrating an example of a second determination table for use in the wireless adapter as the wireless relay device according to an embodiment of the present invention.

FIG. 4 is a diagram illustrating an example of the second determination table for use in the wireless adapter as the wireless relay device according to an embodiment of the present invention. As illustrated in FIG. 4, the second determination table TB2 is a table in which the number of measurement points, the determination combination, and the determination criterion (the second criterion) are associated with each other for each diagnosis target in the section managed by the wireless adapter 12.

The diagnosis target is a device or a facility that is a target in which whether or not there is an abnormality is diagnosed in the section managed by the wireless adapter 12. In the example illustrated in FIG. 4, the diagnosis targets include "pump", "fan", and "valve". The number of measurement points is the number of wireless devices for use in a determination as to whether there is an abnormality in the diagnosis target. The determination combination is information that defines a combination of wireless devices for use in a determination as to whether there is an abnormality in the diagnosis target. The above determination criterion is a criterion value for determining that the diagnosis target is abnormal, and indicates a percentage of wireless devices determined to be abnormal among the wireless devices defined in the above determination combination.

In the example illustrated in FIG. 4, "10" as the number of measurement points, "Dev1" to "Dev10" as the determination combination, and "10%" as the determination criterion are associated with the diagnosis target "pump". Further, "5" as the number of measurement points, "Dev11" to "Dev15" as the determination combination, and "30%" as the determination criterion are associated with the diagnosis target "fan". The determination criterion having a small value is associated with the diagnosis target (for example, "pump") in which it is necessary to early perform an abnormality determination.

The interface 28 is an interface for connecting the information terminal device TM to the wireless adapter 12. This interface 28 is, for example, configured to be capable of wireless communication such as infrared communication or NFC. The interface 28 may be configured to be capable of wired communication such as USB communication.

(Wireless Communication Method)

Figure 5:
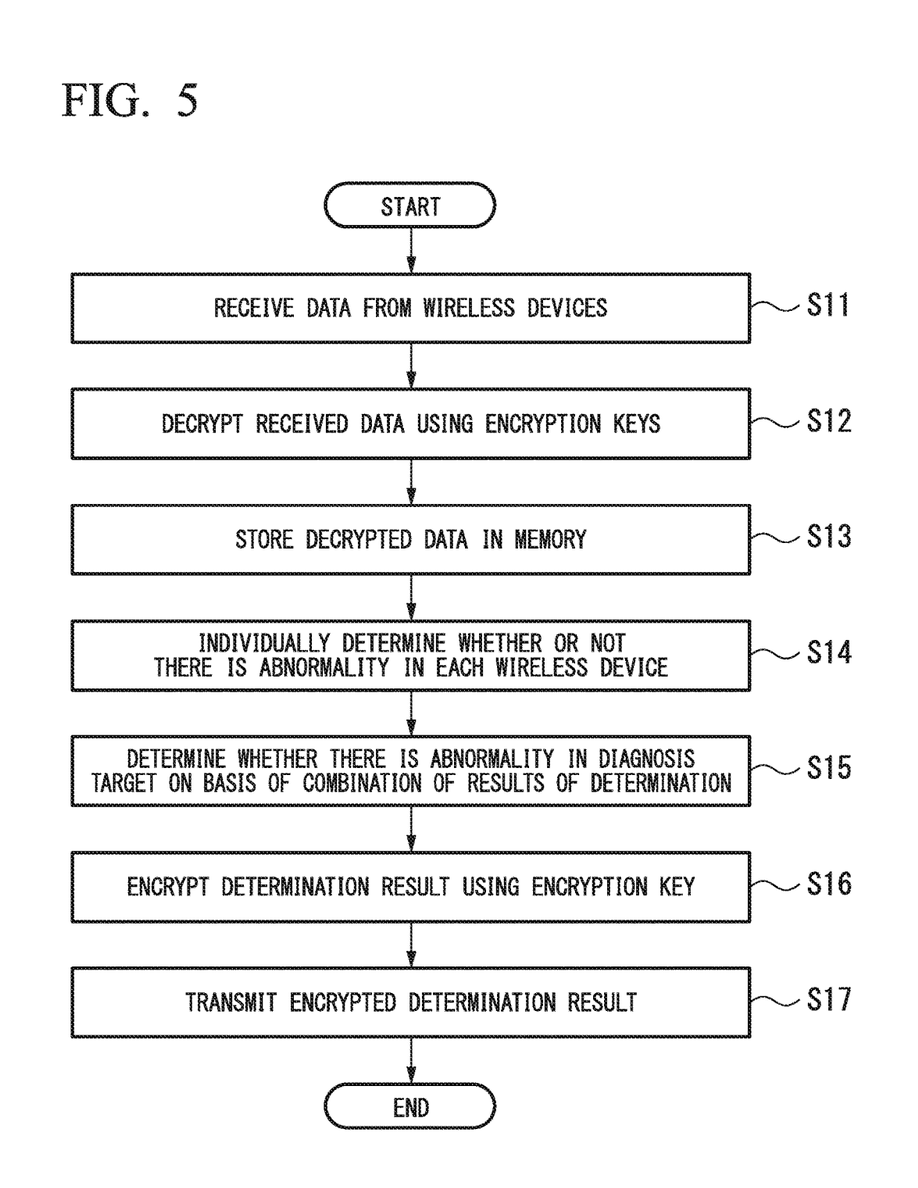
FIG. 5 is a flowchart illustrating an example of a wireless communication method according to an embodiment of the present invention.

FIG. 5 is a flowchart illustrating an example of a wireless communication method according to an embodiment of the present invention. A process of the flowchart illustrated in FIG. 5 is a process that is executed by the wireless adapter 12, and starts in a case in which data received from the wireless devices 11*a* to 11*c* is input to the wireless adapter 12.

In order to simplify the description, it is assumed that a setting of transmission of data to the wireless devices 11*a* to 11*e*, and various settings for the wireless adapter 12 (a setting of a section to which the wireless devices 11*a* to 11*e* belong, and a setting of a transmission destination of the determination result of the wireless adapter 12) have been performed by the system manager 14 in advance. Further, it is assumed that the setting of the determination table (the first determination table TB1 and the second determination table TB2) for the wireless adapter 12 has been performed by the monitoring control device 16 in advance.

If the process starts, first, data transmitted from the wireless devices 11a to 11c over the wireless network N1 is received by the wireless communicator 21 of the wireless adapter 12 (step S11: first step). The data received by the wireless communicator 21 is output to the packet relay 22. Here, since the data transmitted from the wireless devices 11a to 11c is data directed to the wireless adapter 12, the data output to the packet relay 22 is output to the encryption processor 23.

Then, in the encryption processor 23, a process of decrypting the data transmitted from the wireless devices 11a to 11c using the encryption keys K1 to K3 (see FIG. 1) is performed (step S12: second step). The decrypted data is output from the encryption processor 23 to the controller 26, and is stored as device data D1 in the memory 27 under the control of the controller 26 (step S13). The data transmitted from the wireless device 11a is decrypted using the encryption key K1, the data transmitted from the wireless device 11b is decrypted using the encryption key K2, and the data transmitted from the wireless device 11c is decrypted using the encryption key K3.

If this process ends, the device data D1 and the first determination table TB1 stored in the memory 27 are read under the control of the controller 26. A process of individually determining whether or not there is an abnormality in the wireless devices 11a to 11c using the read device data D1 is performed by the determiner 25 with reference to the first determination table TB1 that has been read (step S14: third step; first determination step). A result of the determination of the determiner 25 obtained in this process is stored in the memory 27.

For example, a value of sensor data transmitted from the wireless device 11a to which a device number "Dev1" is assigned is assumed to be "28". The value "28" of this sensor data is not smaller than a lower threshold value "0" set in the device number "Dev1" of the first determination table TB1 illustrated in FIG. 3, and is not greater than an upper threshold value "80". Therefore, the determiner 25 determines that there is no abnormality in the wireless device 11a (pass).

Further, for example, a value of sensor data transmitted from the wireless device 11b to which a device number "Dev2" is assigned is assumed to be "120". The value "120" of this sensor data is greater than the upper threshold value "80" set in the device number "Dev2" of the first determination table TB1 illustrated in FIG. 3. Therefore, the determiner 25 determines that there is an abnormality in the wireless device 11b (fail).

Status data (data indicating a status of the wireless devices 11a to 11c) is also included in the device data D1 stored in the memory 27, in addition to the sensor data. The determiner 25 determines that there is an abnormality in the wireless device of which the status data is an abnormality (fail) regardless of the sensor data (fail). That is, the determiner 25 determines that there is an abnormality (fail) in the wireless device of which the status data is an abnormality (fail) even when the sensor data is not smaller than the lower threshold value and is not greater than the upper threshold value.

Subsequently, the second determination table TB2 stored in the memory 27 is read under the control of the controller 26. A process of determining whether there is an abnormality in a diagnosis target in the section managed by the wireless adapter 12 is performed by the determiner 25 on the basis of a combination of the results of the determination in step S14 with reference to the second determination table TB2 that has been read (step S15: third step; second determination step). A result of the determination of the determiner 25 obtained in this process is stored in the memory 27.

For example, in a case in which the diagnosis target is "pump", the determiner 25 refers to the second determination table TB2 illustrated in FIG. 4, and uses a result of a determination as to whether there is an abnormality in ten wireless devices having device numbers "Dev1" to "Dev10" set therein, to determine whether there is an abnormality in the diagnosis target "pump". It is assumed that a percentage of the wireless devices determined to be abnormal (fail) among the ten wireless devices is "20%". This ratio "20%" is higher than a determination criterion "10%" associated with the diagnosis target "pump" in the second determination table TB2 illustrated in FIG. 4. Therefore, the determiner 25 determines that there is an abnormality in the diagnosis target "pump" (fail).

Further, for example, in a case in which the diagnosis target is "fan", the determiner 25 refers to the second determination table TB2 illustrated in FIG. 4, and uses a result of a determination as to whether there is an abnormality in five wireless devices having device numbers "Dev11" to "Dev15" set therein, to determine whether there is an abnormality in the diagnosis target "fan". It is assumed that a percentage of the wireless devices determined to be abnormal (fail) among the five wireless devices is "20%" which is equal to that in the above example. This ratio "20%" is lower than a determination criterion "30%" associated with the diagnosis target "fan" in the second determination table TB2 illustrated in FIG. 4. Therefore, the determiner 25 determines that there is no abnormality in the diagnosis target "fan" (pass).

If this process ends, the determination result of the determiner 25 is output to the transmission controller 24, and a transmission process of transmitting data indicating the determination result of the determiner 25 to the gateway 15 is performed. Specifically, an address of the gateway 15 is set to a destination address, and a process of generating a packet in which data indicating the above determination result is stored in a payload is performed. When the above transmission process ends, the generated packet is output from the transmission controller 24 to the encryption processor 23. Then, a process of encrypting the packet using the encryption key K10 (see FIG. 1) is performed by the encryption processor 23 (step S16: fourth step). The encrypted packet P20 is output from the encryption processor 23 to the wireless communicator 21 via the packet relay 22 and transmitted to the wireless network N1 (step S17: fifth step).

The data transmitted from the wireless adapter 12 is received by the backbone router 13a over the wireless network N1. The data received by the backbone router 13a is received by the gateway 15 via the backbone network N2. The data received by the gateway 15 is decrypted using the encryption key K10 that is distributed to the gateway 15, and transmitted to the monitoring control device 16 over the control network N3. Thus, the data indicating the determination result of the wireless adapter 12 is collected in the monitoring control device 16.

Here, it is assumed that a worker in the field operates the information terminal device TM in the vicinity of an installation place of the wireless adapter 12 to perform an instruction to acquire the data (device data D1, and data indicating the determination result of the determiner 25) stored in the wireless adapter 12. Then, first, communication between the information terminal device TM and the wireless adapter 12 is started, and the information terminal device TM is connected to the interface 28 of the wireless adapter 12.

Then, a transmission request for the data stored in the wireless adapter 12 is transmitted from the information terminal device TM to the controller 26 of the wireless adapter 12. If this transmission request is received, control for reading the data stored in the memory 27 and transmitting the data from the interface 28 to the information terminal device TM is performed by the controller 26. Thus, the data stored in the memory 27 of the wireless adapter 12 is read to the information terminal device TM. The data read to the information terminal device TM is utilized when the worker in the field performs conservation and maintenance work.

As described above, in this embodiment, the wireless adapter 12 that determines whether or not there is an abnormality using the data transmitted to its own device from the wireless devices 11a to 11c belonging to the preset section, and transmits the determination result to a predefined transmission destination (the gateway 15) is provided in the wireless network N1. Accordingly, since a situation in which unnecessary alarm is generated in the monitoring control device 16 is prevented, it is possible to achieve improved efficiency of the operation of the plant and a reduced burden of the operator.

Further, in this embodiment, the data transmitted from the wireless devices 11a to 11c to the wireless adapter 12 is decrypted and stored in the memory 27, and the determination result of the determiner 25 of the wireless adapter 12 is stored in the memory 27, such that the data stored in the memory 27 of the wireless adapter 12 can be acquired by the information terminal device TM. Accordingly, since the worker in the field can confirm the data stored in the wireless adapter 12 in the field, it is possible to prevent degradation in efficiency of device maintenance work.

Although the wireless relay device, the wireless communication system, and the wireless communication method according to the embodiment of the present invention have been described above, the present invention is not limited to the above-described embodiment and can be freely modified within the scope of the present invention. For example, although the case in which the communication protocol used for wireless communication over the wireless network N1 is a communication protocol conforming to the wireless communication standard ISA100.11a has been described by way of example in the above embodiment, the communication protocol used for wireless communication over the wireless network N1 may be a communication protocol conforming to wirelessHART (registered trademark) or ZigBee (registered trademark).

Further, in the above-described embodiment, the example in which the first determination table TB1, the second determination table TB2, the device data D1, and the determination result of the determiner 25 are stored in one memory 27 provided in the wireless adapter 12 has been described. However, the wireless adapter 12 may include a memory in which the first determination table TB1 and the second determination table TB2are stored, and a memory in which the device data D1 and the determination result of the determiner 25 are stored.

Further, the example in which the system manager 14 collectively manages the wireless network N1 has been described in the above-described embodiment. However, the function of the system manager 14 may be provided in the wireless adapter 12, and the wireless network managed by the system manager 14 and the wireless network managed by the wireless adapter 12 (a wireless network formed by the wireless devices 11a to 11c under the control of the wireless adapter 12) may be divided.

Further, the example in which the three wireless devices 11a to 11c are divided to belong to one section and the two wireless devices 11d and 11e are divided to belong to another section as illustrated in FIG. 1 in order to facilitate understanding has been described in the above-described embodiment. However, the number of sections is arbitrary, and the number of wireless devices belonging to each section is also arbitrary.

Further, the example in which the backbone routers 13a and 13b, the system manager 14, and the gateway 15 are realized as respective separate devices has been described in the above-described embodiment. However, any two or more of the devices can be realized as one unit.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless relay device that performs relay of encrypted data over a wireless network, the wireless relay device comprising:
   a determiner that determines whether or not there is an abnormality using first data which is transmitted to its own device from wireless devices belonging to a preset section among wireless devices joining the wireless network;
   a transmission controller that transmits second data indicating a result of the determination of the determiner to a preset transmission destination;
   an encryption processor that decrypts the first data and encrypts the second data transmitted by the transmission controller, and
   a storage that stores a first determination table in which a first determination criterion for determining whether or not there is an abnormality in each of the wireless devices belonging to the section is set, and a second determination table in which a combination of results of the determination as to whether or not there is an abnormality in each of the wireless devices belonging to the section and a second determination criterion for determining whether or not there is an abnormality in a diagnosis target are associated with each other for each diagnosis target in the section, and wherein the determiner individually determines whether or not there is an abnormality in each of the wireless devices belonging to the section using the first data and the first determination table, and determines whether or not there is an abnormality in the section using a combination of results of the determination as to whether or not there is an abnormality in each of the wireless devices belonging to the section and the second determination table.

2. The wireless relay device according to claim 1, wherein the storage further stores at least one of the first data decrypted by the encryption processor and the second data.

3. The wireless relay device according to claim 2, further comprising:
an interface to which an external device is able to be connected; and
a controller that reads at least one of the first data and the second data stored in the storage and outputs the read data to the interface on the basis of a request from the external device connected to the interface.

4. A wireless communication system capable of wireless communication over a wireless network, the wireless communication system comprising:
a wireless relay device that performs relay of encrypted data over the wireless network, the wireless relay device comprising:
a determiner that determines whether or not there is an abnormality using first data which is transmitted to its own device from wireless devices belonging to a preset section among wireless devices joining the wireless network;
a transmission controller that transmits second data indicating a result of the determination of the determiner to a preset transmission destination;
an encryption processor that decrypts the first data and encrypts the second data transmitted by the transmission controller; and
a storage that stores a first determination table in which a first determination criterion for determining whether or not there is an abnormality in each of the wireless devices belonging to the section is set, and a second determination table in which a combination of results of the determination as to whether or not there is an abnormality in each of the wireless devices belonging to the section and a second determination criterion for determining whether or not there is an abnormality in a diagnosis target are associated with each other for each diagnosis target in the section, and
a high-level device that collects the second data transmitted from the wireless relay device, and
wherein the determiner individually determines whether or not there is an abnormality in each of the wireless devices belonging to the section using the first data and the first determination table, and determines whether or not there is an abnormality in the section using a combination of results of the determination as to whether or not there is an abnormality in each of the wireless devices belonging to the section and the second determination table.

5. The wireless communication system according to claim 4, further comprising:
a gateway that is set as a transmission destination of the second data, decrypts the second data transmitted from the wireless relay device, and outputs the decrypted data to the high-level device.

6. The wireless communication system according to claim 5, further comprising:
a management device that performs a setting of the section and performs a setting of a transmission destination of the second data for the wireless relay device.

7. The wireless communication system according to claim 6,
wherein the management device sets a first encryption key for use in a process of encrypting the first data for the wireless device and the wireless relay device belonging to the section, and sets a second encryption key for use in a process of encrypting the second data for the wireless relay device and the gateway.

8. The wireless communication system according to claim 4,
wherein the high-level device sets, for the wireless relay device, the first determination table and the second determination table for use in the determination as to whether or not there is an abnormality in the determiner.

9. A wireless communication method of performing wireless communication over a wireless network, the wireless communication method comprising:
a first step of receiving first data which is transmitted to its own device from wireless devices belonging to a preset section among wireless devices joining the wireless network;
a second step of decrypting the first data received in the first step;
a third step of determining whether or not there is an abnormality using the first data decrypted in the second step;
a fourth step of encrypting a result of the determination of the third step, as second data; and
a fifth step of transmitting the second data to the wireless network, and
wherein the third step includes individually determining whether or not there is an abnormality in each of the wireless devices belonging to the section using the first data and a first determination table in which a first determination criterion for determining whether or not there is an abnormality in each of the wireless devices belonging to the section is set, and includes determining whether or not there is an abnormality in a diagnosis target using a combination of results of the determination as to whether or not there is an abnormality in each of the wireless devices belonging to the section and a second determination table in which a combination of results of the determination as to whether or not there is an abnormality in each of the wireless devices belonging to the section and a second determination criterion for determining whether or not there is an abnormality in the section are associated with each other for each diagnosis target in the section.

* * * * *